United States Patent [19]
Guggenheim et al.

[11] 4,080,534
[45] Mar. 21, 1978

[54] INFRARED DETECTION AND TRANSMISSION APPARATUS

[75] Inventors: Howard Joseph Guggenheim, Bridgewater; Henry Miles O'Bryan, Jr., Plainfield; LeGrand Gerard Van Uitert, Morris Township, Morris County, all of N.J.

[73] Assignee: Bell Telephone Laboratories, Incorporated, Murray Hill, N.J.

[21] Appl. No.: 763,285

[22] Filed: Jan. 28, 1977

[51] Int. Cl.² ............................ G01J 1/00; G02B 5/20
[52] U.S. Cl. ...................... 250/338; 250/504; 350/1.1
[58] Field of Search ............... 250/338, 339, 504, 503, 250/510; 350/1

[56] References Cited
U.S. PATENT DOCUMENTS

| 2,660,925 | 12/1953 | Turner | 350/1 |
| 2,834,689 | 5/1958 | Jupnik | 350/1 X |
| 3,744,870 | 7/1973 | Tomiki et al. | 350/1 |

Primary Examiner—Davis L. Willis
Attorney, Agent, or Firm—Peter V. D. Wilde

[57] ABSTRACT

Infrared detection and transmission apparatus are disclosed which incorporate an infrared transparent window consisting essentially of thorium fluoride. Due to high resistance to thermal shock, thorium fluoride window material may be used to advantage under extreme atmospheric conditions or for the transmission of infrared radiation at high power levels.

10 Claims, 3 Drawing Figures

INFRARED DETECTION AND TRANSMISSION APPARATUS

BACKGROUND OF THE INVENTION

1. Field of the Invention

The invention is concerned with infrared transmission media in infrared radiation detection and transmission apparatus.

2. Description of the Prior Art

Infrared radiation detection devices have found commercial and military application, for example, in thermometers, alarm systems, night vision systems, and anti-aircraft missiles. In the latter application sensitive components of the infrared detection device are typically shielded by a window made of a material which not only permits infrared radiation to pass freely but which is also resistant to deterioration or breakage due to thermal shock resulting from atmospheric friction or rain. U.S. Pat. No. 3,911,275, issued to W. H. Dumbaugh, on Oct. 7, 1975, discloses a glass composed of $GeO_2$, $La_2O_3$, $Ta_2O_5$, and ZnO for use as an infrared transparent window in infrared detection systems.

Materials which are infrared transparent and resistant to thermal shock are also applicable in infrared transmission apparatus such as high power lasers which can be used, e.g., for separating gaseous isotopes, for atomic fusion, for military application, and for medical application in microsurgery. In the latter case the window may take the form of an optical fiber which may be instrumental, e.g., in guiding infrared radiation so as to cauterize abdominal ulcers.

According to Frances M. Lussier, "Guide to ir-transmissive Materials," *Laser Focus*, December 1976, pages 47–50, thermal shock resistance can be measured by a figure of merit which is inversely dependent on thermal expansion. Consequently, small thermal expansion is desirable in infrared window material. Furthermore, to minimize the tendency towards internal fracture, thermal expansion should desirably be isotropic.

SUMMARY OF THE INVENTION

Virtual absence of thermal expansion in the range of from 250° C to 600° C makes thorium fluoride eminently suited as self-supporting window material in infrared detection and transmission apparatus. Such window material is highly transparent to electromagnetic radiation having wavelengths in the range of from 0.1 $\mu$m to 11 $\mu$m, is unaffected by moisture at temperatures up to about 400° C, and is capable of withstanding thermal shock as caused by a large temperature gradient.

DETAILED DESCRIPTION

Figure 1:
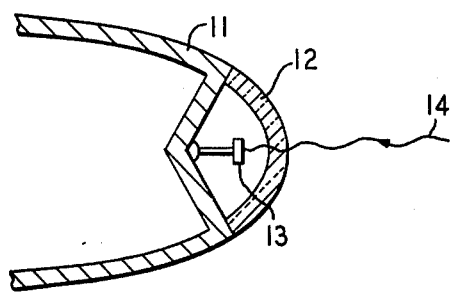
FIG. 1 shows in cross section a nose cone of an anti-aircraft missile equipped with an infrared radiation detector.

FIG. 1 shows nose cone 11 equipped with thorium fluoride window 12 and gimbal-mounted infrared diode detector 13. Infrared radiation 14 passes through window 12 and is sensed by detector 13.

Figure 2:
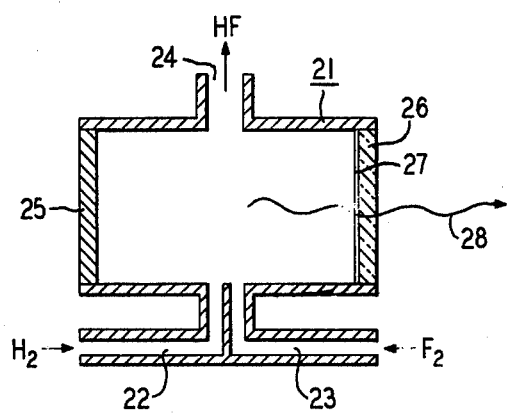
FIG. 2 shows in cross section a hydrogen-fluorine laser.

FIG. 2 shows reaction chamber 21 equipped with hydrogen inlet 22, fluorine inlet 23, hydrogen fluoride outlet 24, water cooled, 100 percent reflective mirror 25, and thorium fluoride window 26 with 99 percent reflective coating 27. Chemical reaction between hydrogen gas entering through inlet 22 and fluorine gas entering through inlet 23 produces laser radiation 28 which passes through window 27.

Figure 3:
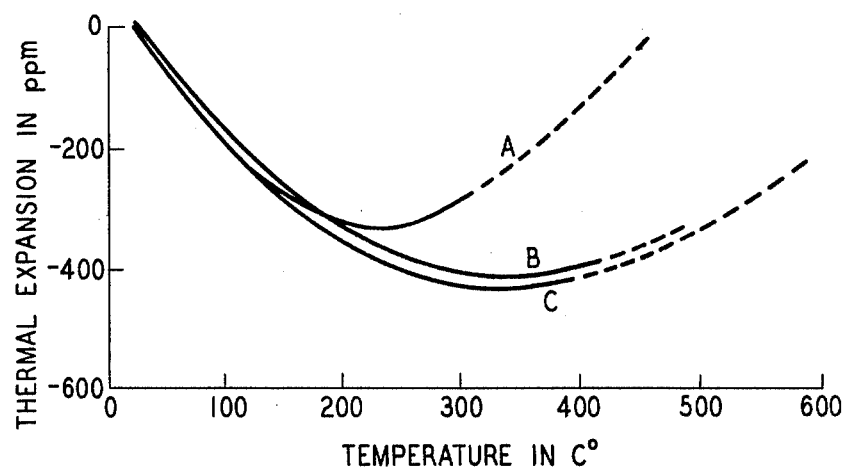
FIG. 3 is a diagram which shows thermal expansion on the three axes of monoclinic thorium fluoride as a function of temperature.

FIG. 3 shows curves A, B, and C corresponding to thermal expansion coefficient on the three axes of monoclinic thorium fluoride. Thermal expansion was measured by dilatometry on the thorium fluoride crystal manufactured by the procedure described below and oriented by means of standard X-ray techniques. It can be seen that over the range of from 25° C to 600° C thermal expansion is very small and virtually isotropic.

Table I shows thermal expansion coefficient $\alpha$, cut-off wavelength $\lambda$, and refractive index $n$ for thorium fluoride and a number of commercially available window materials. The meaning of $\lambda$ is as follows: for wavelengths in the range of from 0.1 $\mu$m up to $\lambda$, transmissivity of the material is at least ten percent whereas for wavelengths exceeding $\lambda$, transmissivity is less than ten percent. It can be seen e.g., that thorium fluoride is nearly as transparent as barium fluoride but has superior thermal shock resistance due to its essentially zero thermal expansion.

TABLE I

| Material | $\lambda$ | $\alpha$ | n |
| --- | --- | --- | --- |
| $ThF_4$ | 11 $\mu$m | ~0 | 1.52 |
| $BaF_2$ | 12 $\mu$m | $18 \cdot 10^{-6}$ | 1.47 |
| $CaF_2$ | 8 $\mu$m | $24 \cdot 10^{-6}$ | 1.43 |
| $MgF_2$ | 8 $\mu$m | $11.5 \cdot 10^{-6}$ | 1.47 |
| ZnSe | 22 $\mu$m | $8.5 \cdot 10^{-6}$ | 2.45 |
| ZnS | 12 $\mu$m | $6.7 \cdot 10^{-6}$ | 2.26 |
| $ThO_2$ | 9 $\mu$m | $8 \cdot 10^{-6}$ | ~1.8 |
| Fused $SiO_2$ | 4 $\mu$m | $0.5 \cdot 10^{-6}$ | 1.46 |
| $Si_3N_4$ | 6 $\mu$m | $2.5 \cdot 10^{-6}$ | ~2 |

Preparation of single crystal thorium fluoride may proceed as follows: using an aqueous solution of thorium nitrate, thorium fluoride is precipitated by adding hydrofluoric acid. The precipitate is sintered in a hydrogen fluoride atmosphere at a temperature of about 800° C for about twenty-four hours and fused at a temperature of about 1150° C. The fused material is placed in a graphite container and zone refined using many passes and a hot zone having a temperature of about 1150° C.

In application where isotropic optical properties are called for, monocrystalline thorium fluoride is not applicable as such. However, optically isotropic polycrystalline thorium fluoride is easily obtained from a single crystal either by hot deforming at a temperature substantially below its melting point or by casting the molten material. Cast material may contain appreciable amounts of oxygen which can be removed by zone refining. The presence of a few anion percent oxygen in thorium fluoride polycrystalline material was found to be tolerable in many cases.

Self-supporting thorium fluoride windows may be conveniently manufactured in thicknesses down to one mil. In applications where a thorium fluoride window is exposed to temperatures exceeding approximately 400° C in the presence of oxygen it is desirable to apply a protective coating to the surface in order to minimize surface oxidation. Among suitable coating materials are $ThO_2$, ZnS, $MgF_2$, and very thin films of $SiO_2$ or $Si_3N_4$.

What is claimed is:

1. An infrared radiation detection system comprising first means for detecting infrared radiation and second means for housing said first means CHARACTERIZED IN THAT said second means comprises an infrared transparent window consisting essentially of thorium fluoride.

2. Detection system of claim 1 in which said window is a single crystal.

3. Detection system of claim 1 in which said window is in a polycrystalline state.

4. Detection system of claim 1 in which an exposed surface of said window is coated with a protective coating.

5. Detection system of claim 4 in which the material of said coating is selected from the group consisting of $ThO_2$, $ZnS$, $MgF_2$, $SiO_2$, and $Si_3N_4$.

6. An infrared transmission system comprising first means for producing infrared radiation and second means for housing said first means CHARACTERIZED IN THAT said second means comprises an infrared transparent window consisting essentially of thorium fluoride.

7. Transmission system of claim 6 in which said window is a single crystal.

8. Transmission system of claim 6 in which said window is in a polycrystalline state.

9. Transmission system of claim 6 in which an exposed surface of said window is coated with a protective coating.

10. Transmission system of claim 9 in which the material of said coating is selected from the group consisting of $ThO_2$, $ZnS$, $MgF_2$, $SiO_2$, and $Si_3N_4$.

* * * * *

UNITED STATES PATENT AND TRADEMARK OFFICE
CERTIFICATE OF CORRECTION

PATENT NO. : 4,080,534

DATED : March 21, 1978

INVENTOR(S) : Howard J. Guggenheim, Henry M. O'Bryan and LeGrand G. Van Uitert

It is certified that error appears in the above-identified patent and that said Letters Patent are hereby corrected as shown below:

Column 1, line 44, change "250°C" to --25°C--.

Column 2, line 38, change "$2.5 \cdot 10^{-6}$" to --$3.5 \cdot 10^{-6}$--.

Signed and Sealed this

Fifteenth Day of August 1978

[SEAL]

Attest:

RUTH C. MASON
*Attesting Officer*

DONALD W. BANNER
*Commissioner of Patents and Trademarks*